US006957485B2

(12) United States Patent
Campbell

(10) Patent No.: US 6,957,485 B2
(45) Date of Patent: Oct. 25, 2005

(54) MOLDABLE CABLE TERMINATION SYSTEM

(75) Inventor: Richard V. Campbell, Tallahassee, FL (US)

(73) Assignee: Kwoleck L.L.C., Tallahassee, FL (US)

( * ) Notice: Subject to any disclaimer, the term of this patent is extended or adjusted under 35 U.S.C. 154(b) by 0 days.

(21) Appl. No.: 10/805,749

(22) Filed: Mar. 22, 2004

(65) Prior Publication Data

US 2005/0204555 A1    Sep. 22, 2005

(51) Int. Cl.[7] .............................................. H01R 43/00
(52) U.S. Cl. ............................ 29/858; 29/857; 403/268
(58) Field of Search ........................ 29/825, 857, 858; 403/268

(56) References Cited

U.S. PATENT DOCUMENTS

| | | | | |
|---|---|---|---|---|
| 3,660,887 A | * | 5/1972 | Davis .......................... 264/262 |
| 3,698,749 A | * | 10/1972 | Yonkers ....................... 403/197 |
| 3,739,457 A | * | 6/1973 | Davis ............................. 29/460 |
| 4,184,784 A | * | 1/1980 | Killian ......................... 403/267 |
| 4,367,568 A | * | 1/1983 | Weiser ......................... 24/122.6 |
| 5,525,003 A | * | 6/1996 | Williams et al. ............ 403/267 |
| 5,718,532 A | * | 2/1998 | Mower ........................ 403/269 |

* cited by examiner

Primary Examiner—Carl J. Arbes
(74) Attorney, Agent, or Firm—J. Wiley Horton

(57) ABSTRACT

A process and devices which allow the formation of a molded termination at some point on a cable. A shell is used to surround and hold the strands to be terminated. This shell is made from a first material. The strands are bonded to the shell, typically using potting compound. A second material is then molded over the shell to form a complete termination. In another embodiment, the shell is actually created from the potting compound itself by allowing the potting compound to harden in a mold.

20 Claims, 17 Drawing Sheets

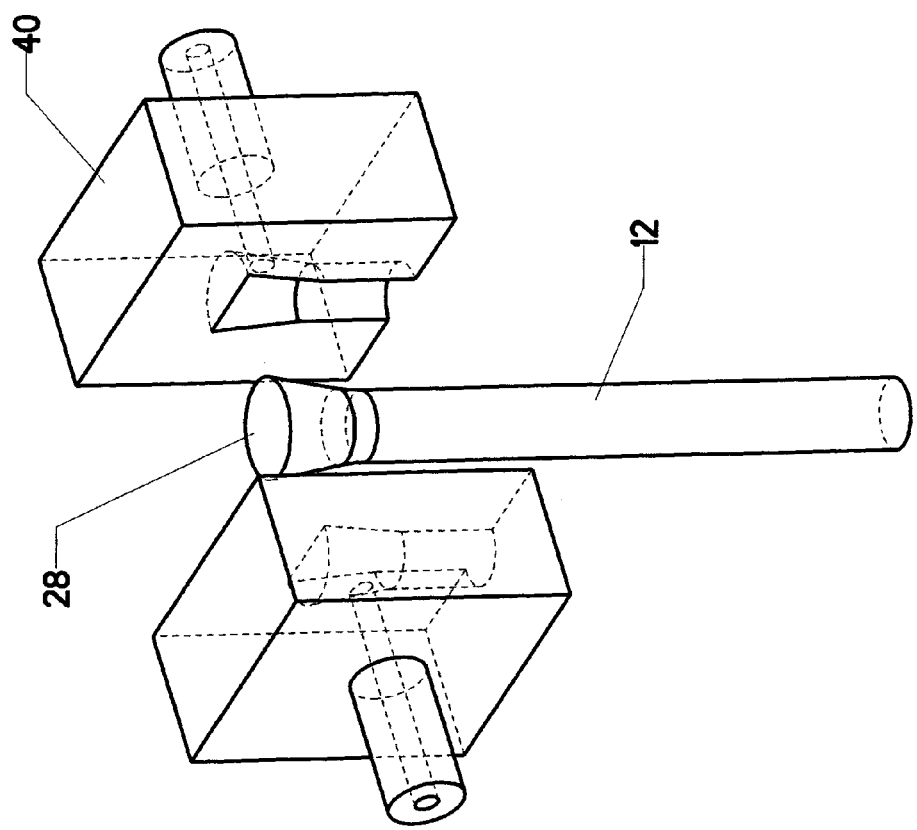

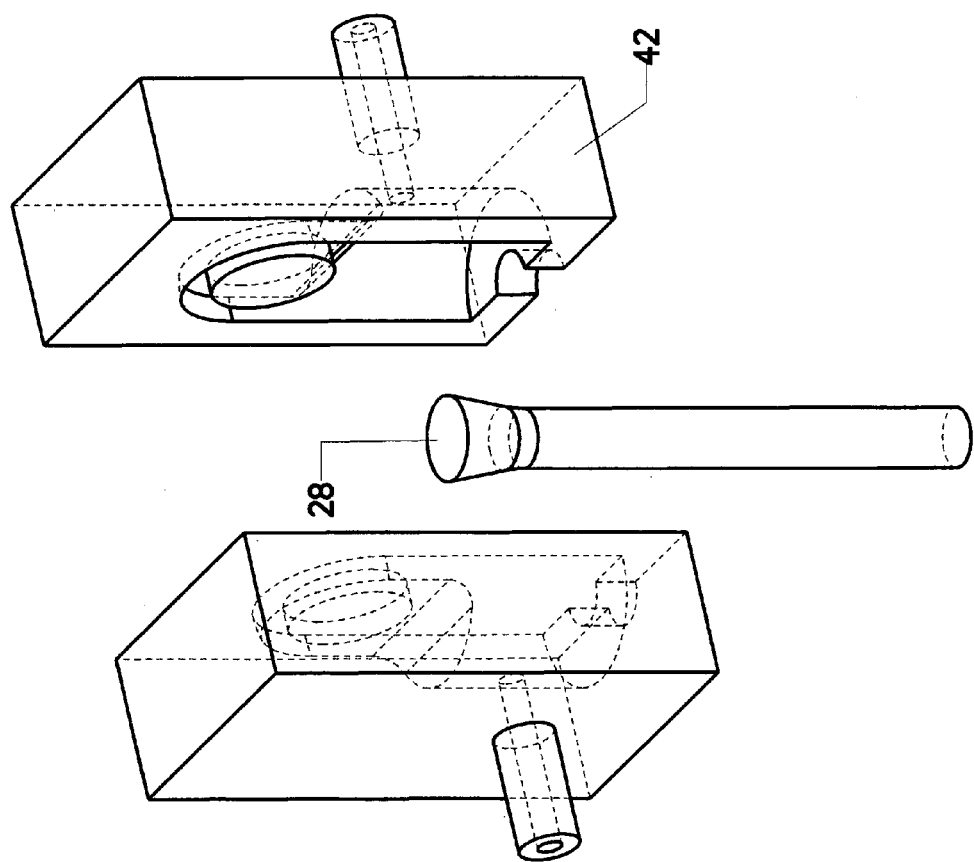

MOLDABLE CABLE TERMINATION SYSTEM

CROSS-REFERENCES TO RELATED APPLICATIONS

Pursuant to 37 CFR §1.53, this application claims the benefit of an earlier-filed provisional application. The earlier application listed the same inventor. It was filed on Mar. 21, 2003, and was assigned Ser. No. 60/453,783.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of cables and ropes. More specifically, the invention comprises a method for affixing an anchor to the end of a cable in order to form a termination, along with devices for carrying out the method.

2. Description of the Related Art

Devices for mounting a termination on the end of a wire, rope, or cable are disclosed in detail in copending U.S. Application Ser. No. 60/404,973 to Campbell, which is incorporated herein by reference.

The individual components of a wire rope are generally referred to as "strands," whereas the individual components of synthetic cables are generally referred to as "fibers." For purposes of this application, the term "strands" will be used generically to refer to both.

Cables must generally be attached to some type of load-bearing fitting in order to transmit a tensile load. This load-bearing fitting will be generically referred to as an "anchor." The anchor is attached to the strands (typically on an end of the cable, but sometimes at an intermediate point). Once the strands are attached to the anchor, the anchor and the encompassed strands are collectively referred to as a "termination."

It is known to create a termination by first infusing the strands proximate an end of a cable with liquid potting compound, then placing the strand within an internal passage within an anchor, then allowing the liquid potting compound to harden into a solid. The internal passage usually has an expanding shape, so that the solidified potting compound locks into the anchor.

A mold can be substituted for the internal passage within an anchor. A simple two piece mold can be clamped around the strands to hold them in place while the potting compound hardens. A more sophisticated mold can be used to clamp around dry strands and then inject the liquid potting compound.

Cable strands are often quite fine, which dictates the use of a potting compound having certain characteristics (such as low viscosity). While such a compound is well suited for wetting the strands, it may not be well suited for forming the balance of the termination. Thus, it may be desirable to use one potting compound to lock the fibers within the termination, and a second compound to form the balance of the termination. The present invention features this approach.

BRIEF SUMMARY OF THE PRESENT INVENTION

The present invention comprises a process and devices which allow the formation of a molded termination at some point on a synthetic cable. A first material is used to surround and hold the strands to be terminated. The first material is selected for its suitability in wetting and bonding to the cable strands. A second material is then used to create the balance of the termination, with this second material being selected for its suitability in forming strong mechanical features such as threads, an eye, or a hook.

BRIEF DESCRIPTION OF THE SEVERAL VIEWS OF THE DRAWINGS

FIG. 15 is a perspective view, showing the first molding operation.

FIG. 16 is a perspective view, showing the second molding operation.

Figure 1:
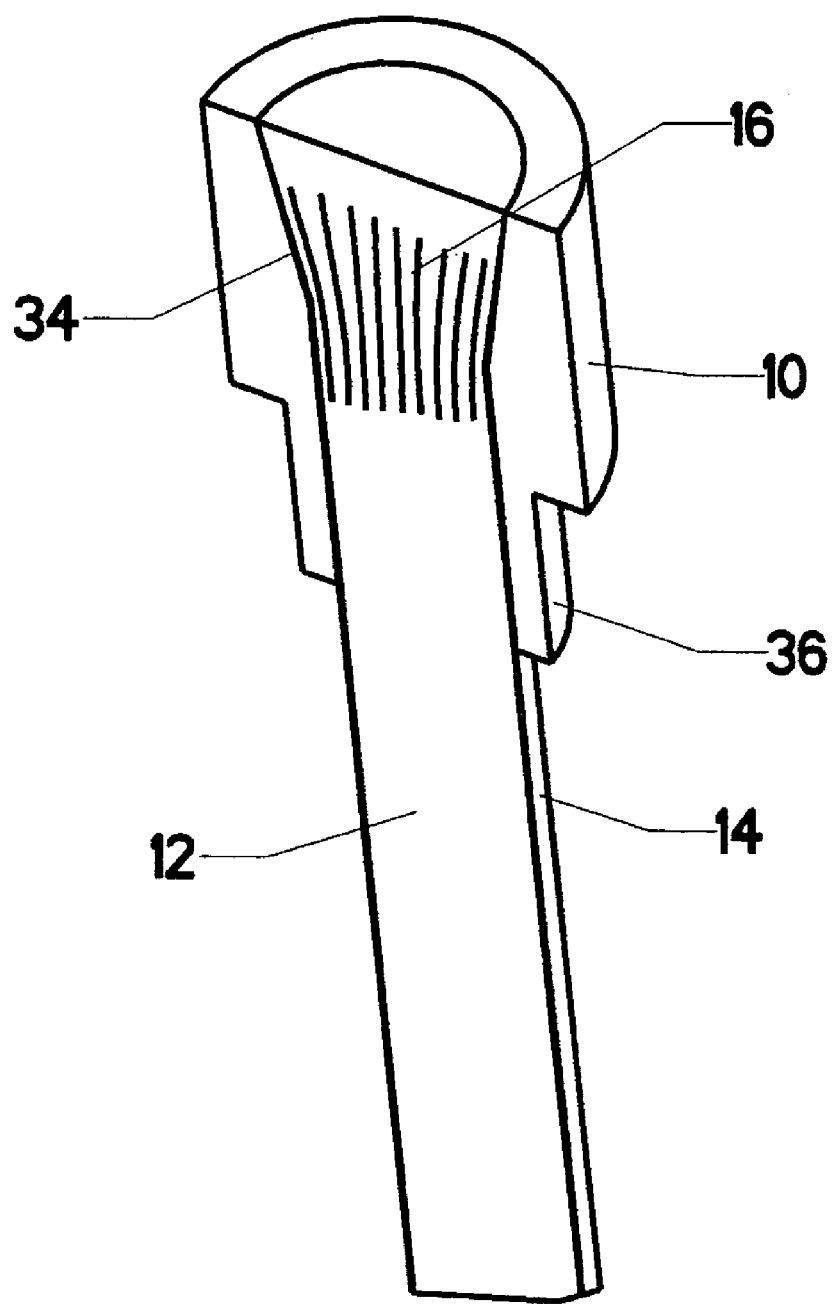
FIG. 1 is a perspective view, showing a shell attached to the end of a cable.

| REFERENCE NUMERALS IN THE DRAWINGS | | | |
|---|---|---|---|
| 10 | shell | 12 | cable |
| 14 | jacket | 16 | splayed strands |
| 18 | molded termination | 20 | separate jacket shield |
| 22 | concave region | 24 | threaded region |
| 26 | positioning tab | 28 | molded region |
| 30 | extended portion | 32 | flow control lip |
| 34 | expanding passage | 36 | cable shield flange |
| 38 | sealing flange | 40 | first mold |
| 42 | second mold | | |

DETAILED DESCRIPTION OF THE INVENTION

FIG. 1 is a section view showing a cable 12. Such a cable may or may not be surrounded by a jacket 14. Shell 10, as shown, is a solid piece having a vertical bore which expands from bottom to top—denoted as expanding passage 34 (This passage could be made in many shapes, the one shown being presented merely as an example). An exposed length of strands within this passage is wetted with liquid potting compound (either before or after being placed within expanding passage 34). Splayed strands 16 remain within shell 10 until the liquid potting compound hardens, thereby locking the strands to shell 10. The term "potting compound" is used in this context to mean any liquid which transforms into a solid after being infused into the splayed strands of a cable. Examples of useful resins include epoxies and certain thermoplastics.

The strands comprising cable 12 (typically high-strength synthetics) often have melting temperatures which are significantly lower than most metals. This fact is unfortunate, since it is often desirable to mold a metal anchor on the end of a cable using a process such as die casting. Directly injecting molten metal around the exposed strands of cable 12 is impractical. The synthetic strands have a diameter which is much smaller than comparable strands within wire rope. In order to completely wet the strands, a low viscosity fluid is needed. Metals must generally be heated to very high temperatures to achieve low viscosity. Such temperatures will generally melt synthetic cable strands. Also, the materials used for molding generally have little ability to adhere directly to strand materials. Thus, the material which is best suited for use as a potting compound is often not well suited for forming the balance of the anchor.

The assembly shown in FIG. 1 resolves this problem. The material comprising shell 10 can be selected to have a high melting temperature and a low thermal conductivity. Certain ceramics would be good examples of materials having the desired characteristics. Once the potting compound has hardened and shell 10 is bonded to cable 12, the assembly is placed within a mold—such as a die casting mold. Molten metal is then injected into the mold to surround shell 10 and bond to it (or be otherwise mechanically interlocked with it).

Figure 2:
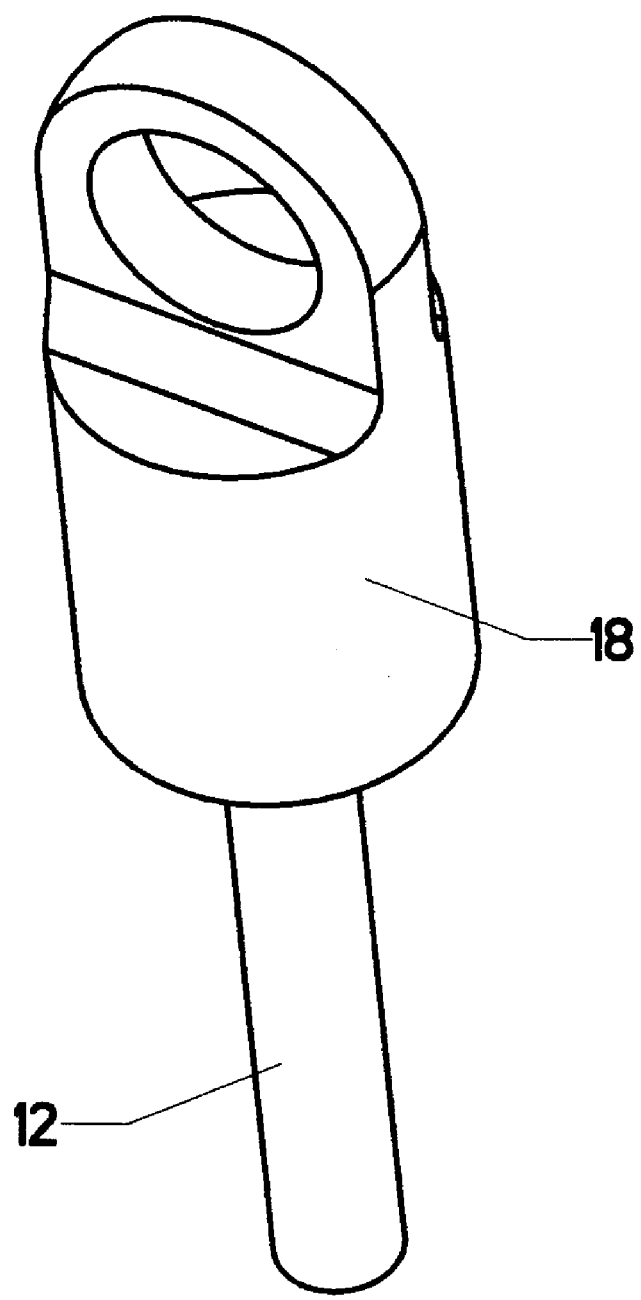
FIG. 2 is a perspective view, showing a molded termination.
Figure 3:
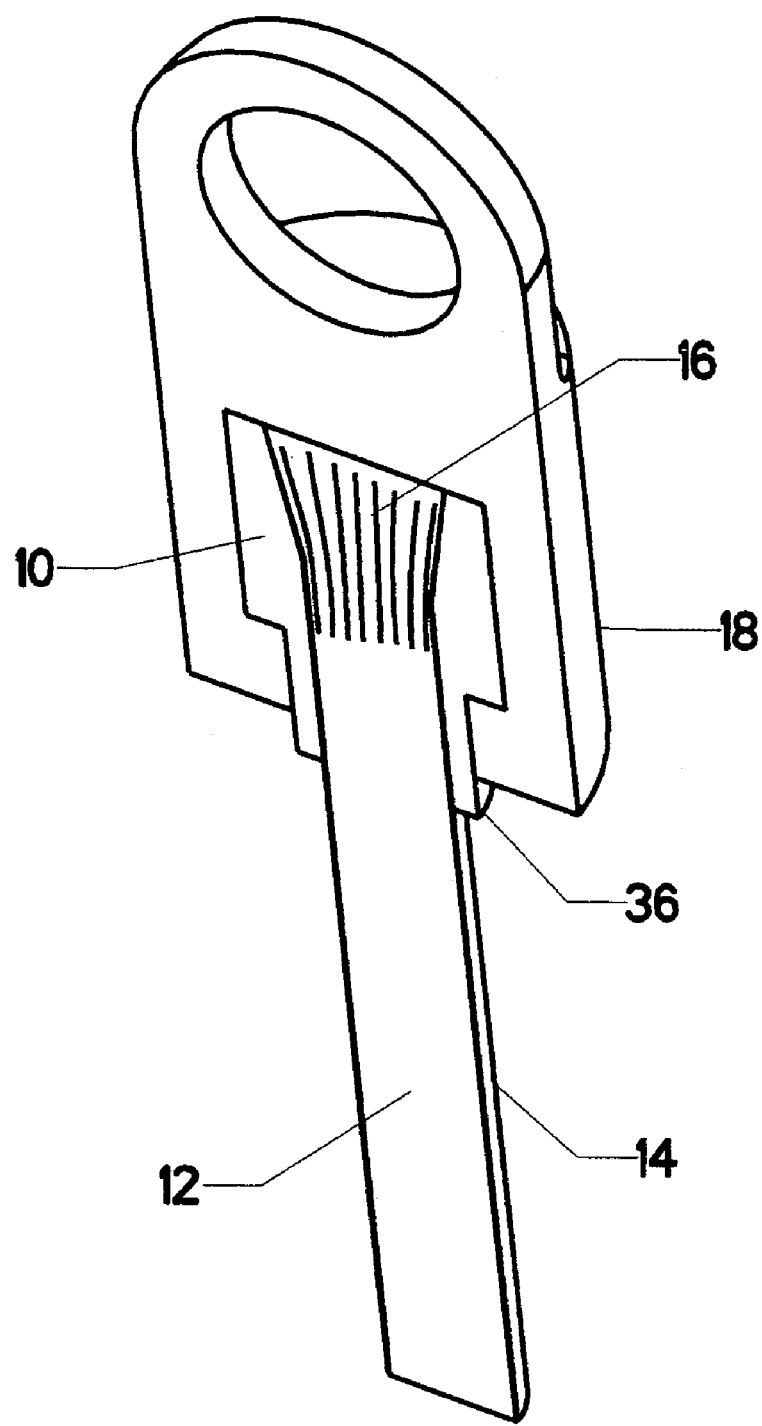
FIG. 3 is a sectional perspective view, showing a molded termination.

FIG. 2 shows a completed molded anchor 18 attached to cable 12. FIG. 3 is a sectional view of the same assembly. The die casting mold was used to form a desired shape for molded anchor 18, including an attachment loop that can be used to attach the cable. In this particular example, a portion of the molded anchor lies beneath shell 10 so that tensile loads placed on the cable can be transmitted to molded anchor 18. The reader will note that the splayed fibers within the shell are locked in place via the hardened potting compound. This creates a very efficient load carrying connection between the cable and the shell. A similarly efficient load carrying connection is made between the shell and the molded anchor.

The reader will observe that shell 10 includes a descending portion denoted as cable shield flange 36. This feature prevents the molten metal within the mold from contacting and damaging jacket 14, or the cable strands themselves for cables having no jacket. Cable shield flange 36 can also provide extra gripping surface if no jacket is used.

Figure 4:
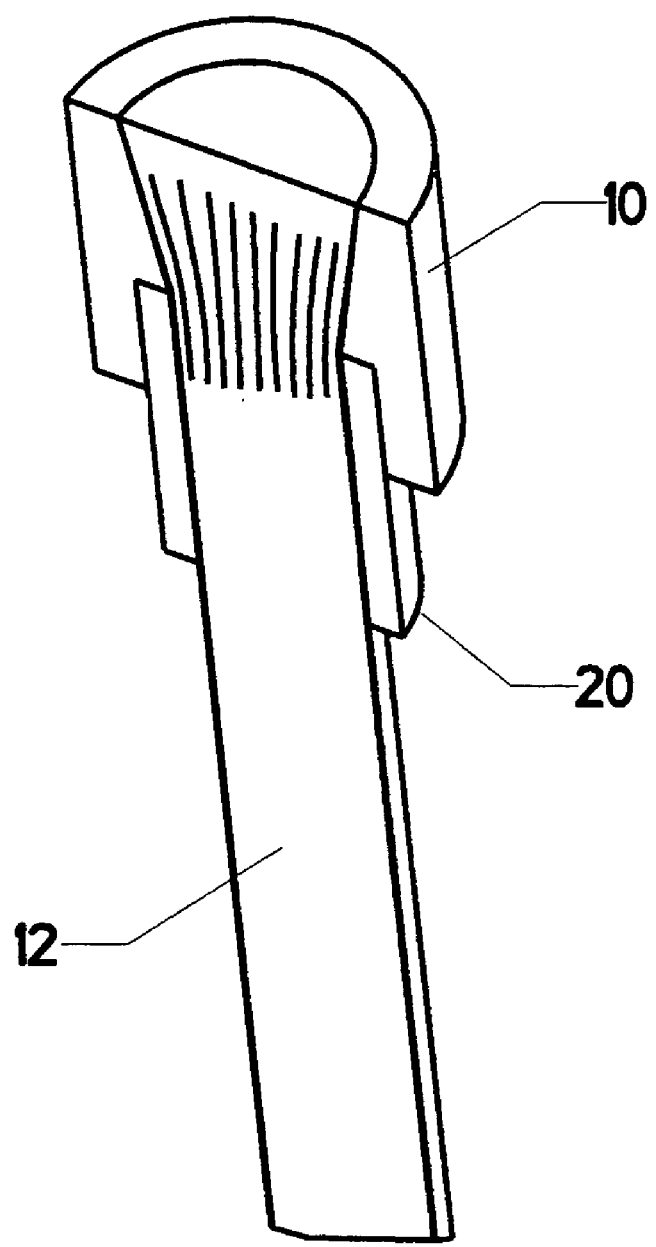
FIG. 4 is a perspective sectional view, showing a shell with a separate jacket shield.

Such a jacket or cable-protecting feature need not be formed integrally. FIG. 4 shows separate jacket shield 20 placed around the jacket to protect it during the die casting process. Separate jacket shield 20 can be designed to remain in place or to be removed after the casting has cooled. Such a separate jacket shield can also be used to protect the core strands on cables having no jacket. It could be made of many different materials using many different processes. If as an example, low thermal conductivity is desired, it could be made of ceramic.

The reader should bear in mind that overcoming the aforementioned melting temperature incompatibility is only an example of what the proposed process can accomplish. The proposed process contemplates creating a termination in stages using dissimilar materials. The process can overcome many prior art limitations other than temperature.

Figure 5:
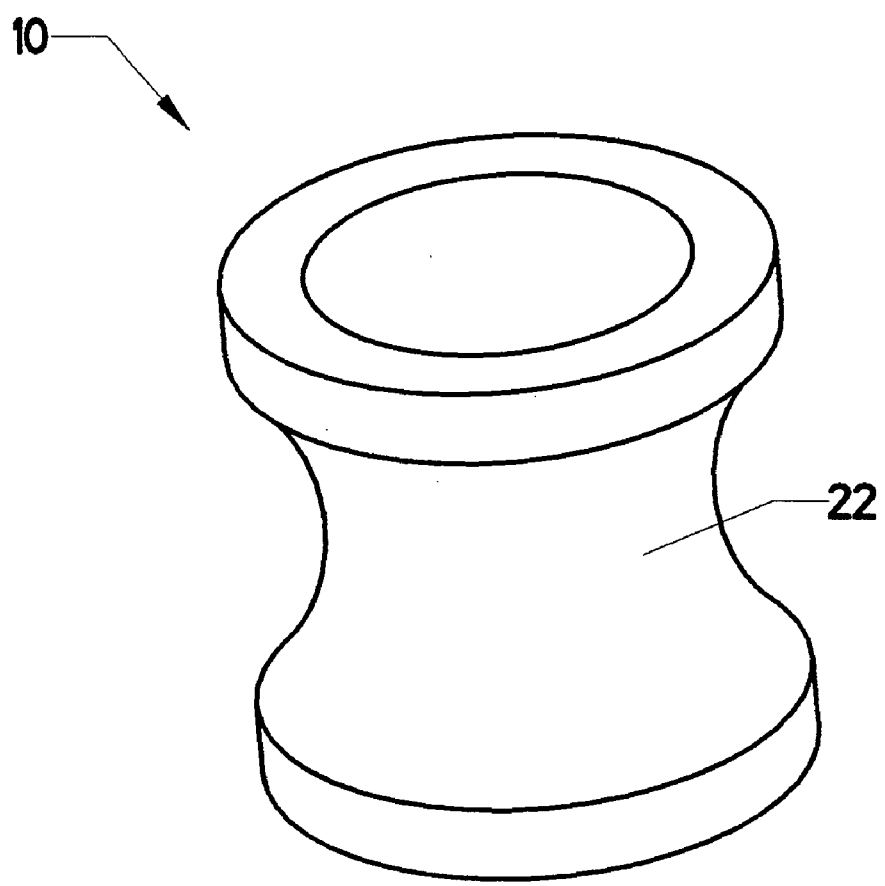
FIG. 5 is a perspective view, showing an alternate embodiment of the shell.
Figure 6:
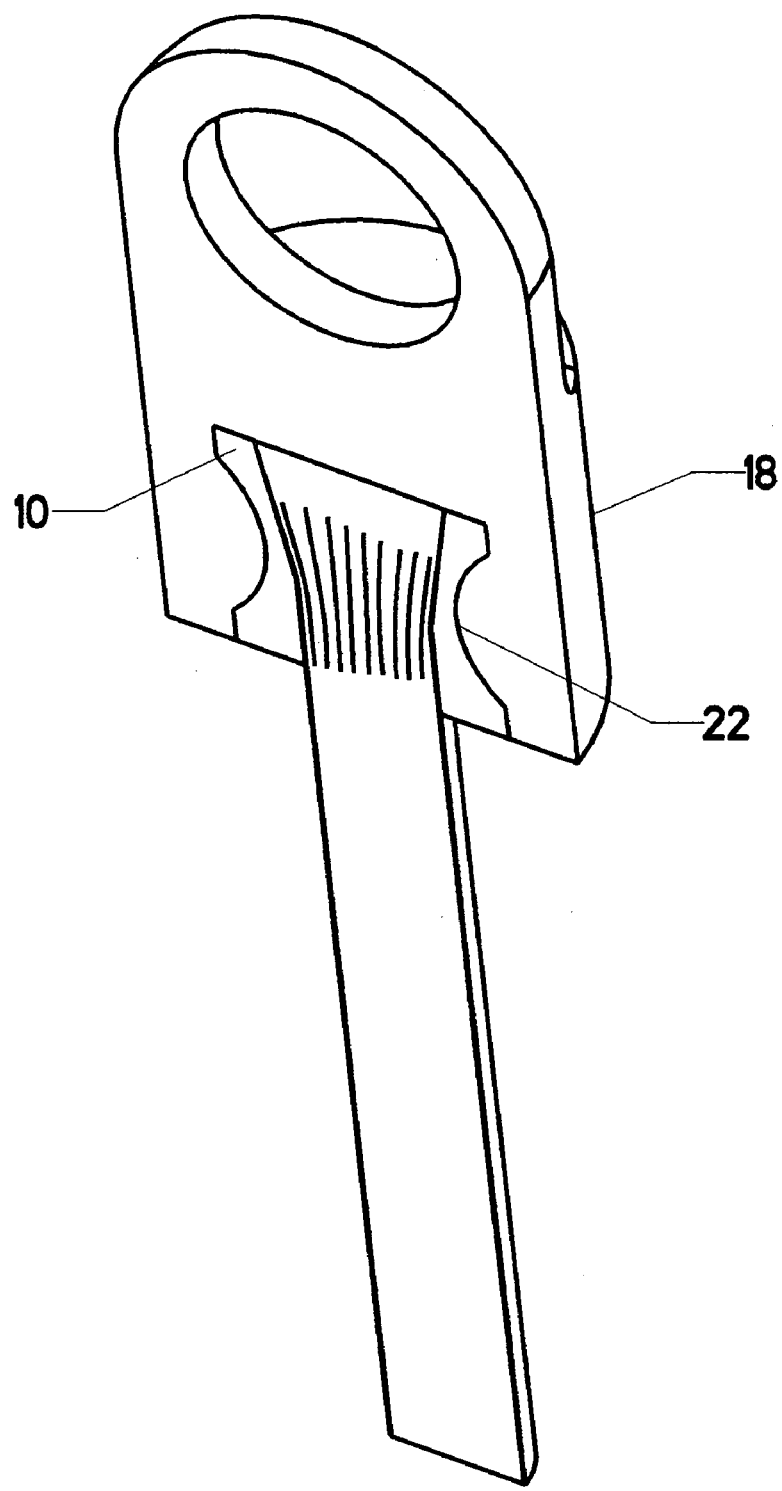
FIG. 6 is a perspective sectional view, showing a molded termination.
Figure 7:
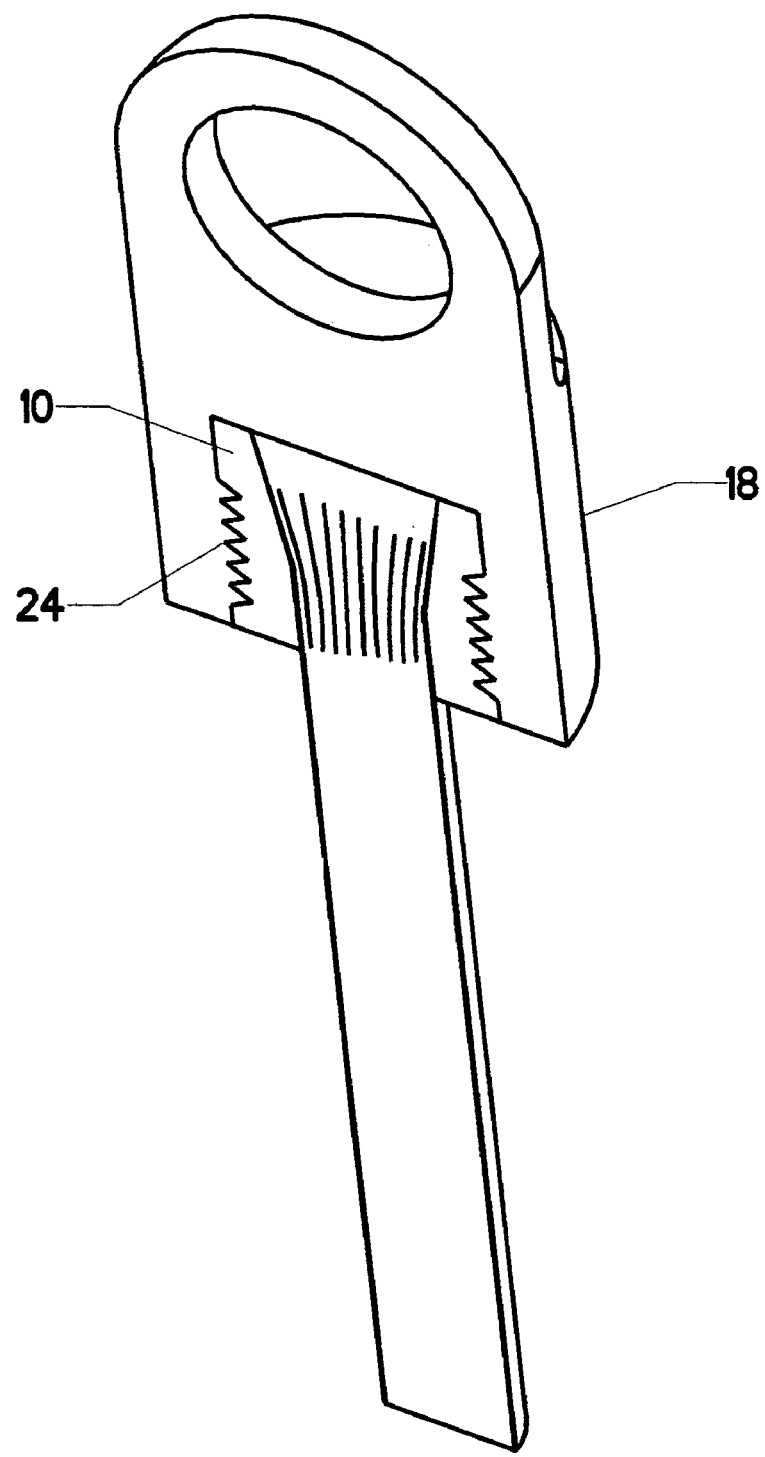
FIG. 7 is a perspective sectional view, showing a molded termination.

Those skilled in the art will realize that many geometric features can be used to lock shell 10 to molded anchor 18. FIG. 5 shows a shell 10 incorporating concave region 22. FIG. 6 shows this shell 10 after a molded anchor 18 has been cast around it. In this example, the molded anchor is again die cast of metal. The molten metal has flowed into and around concave region 22, thereby locking the two components together without having to enclose the lower extreme of shell 10. FIG. 7 shows another type of interlocking geometry in which shell 10 has threaded region 24. Simple serrations could also be used.

Figure 8:
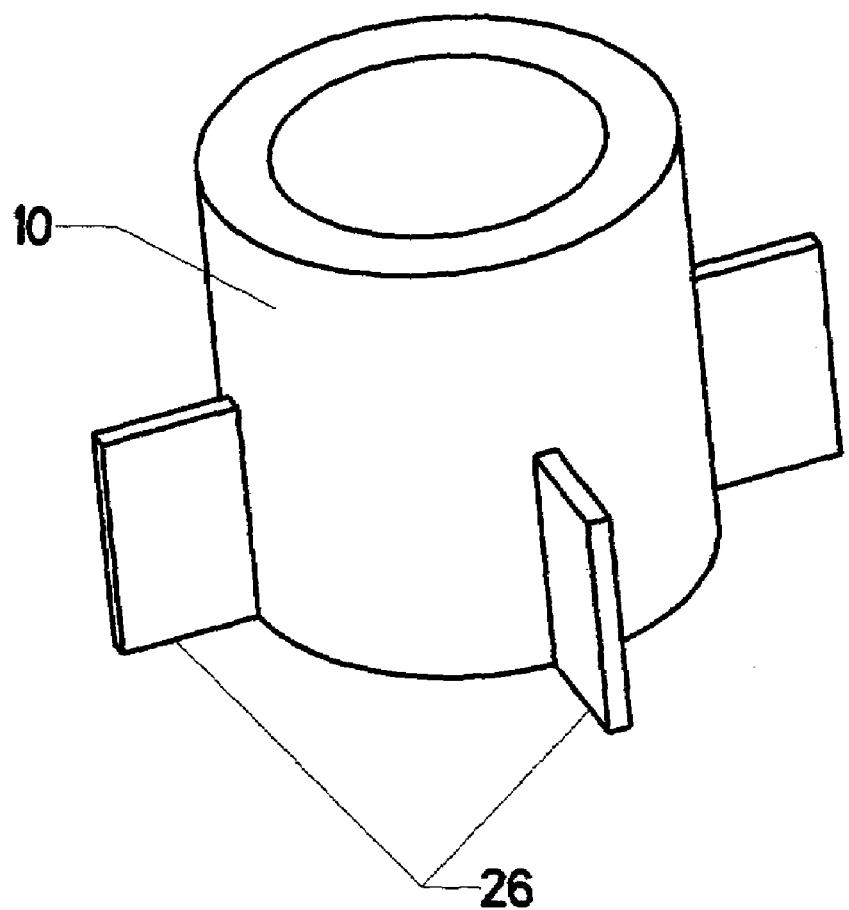
FIG. 8 is a perspective view, showing an alternate embodiment of the shell.

Many useful features can be incorporated into shell 10. As one example, it may be important to ensure that the shell and cable assembly is properly centered in a die casting mold before shooting in the molten metal. FIG. 8 shows a shell 10 which incorporates four positioning tabs 26 (As one example—the number and shape of the tabs could vary). The tips of these tabs make contact with the walls of the mold cavity, thereby ensuring that shell 10 is centered within the mold cavity.

Figure 9:
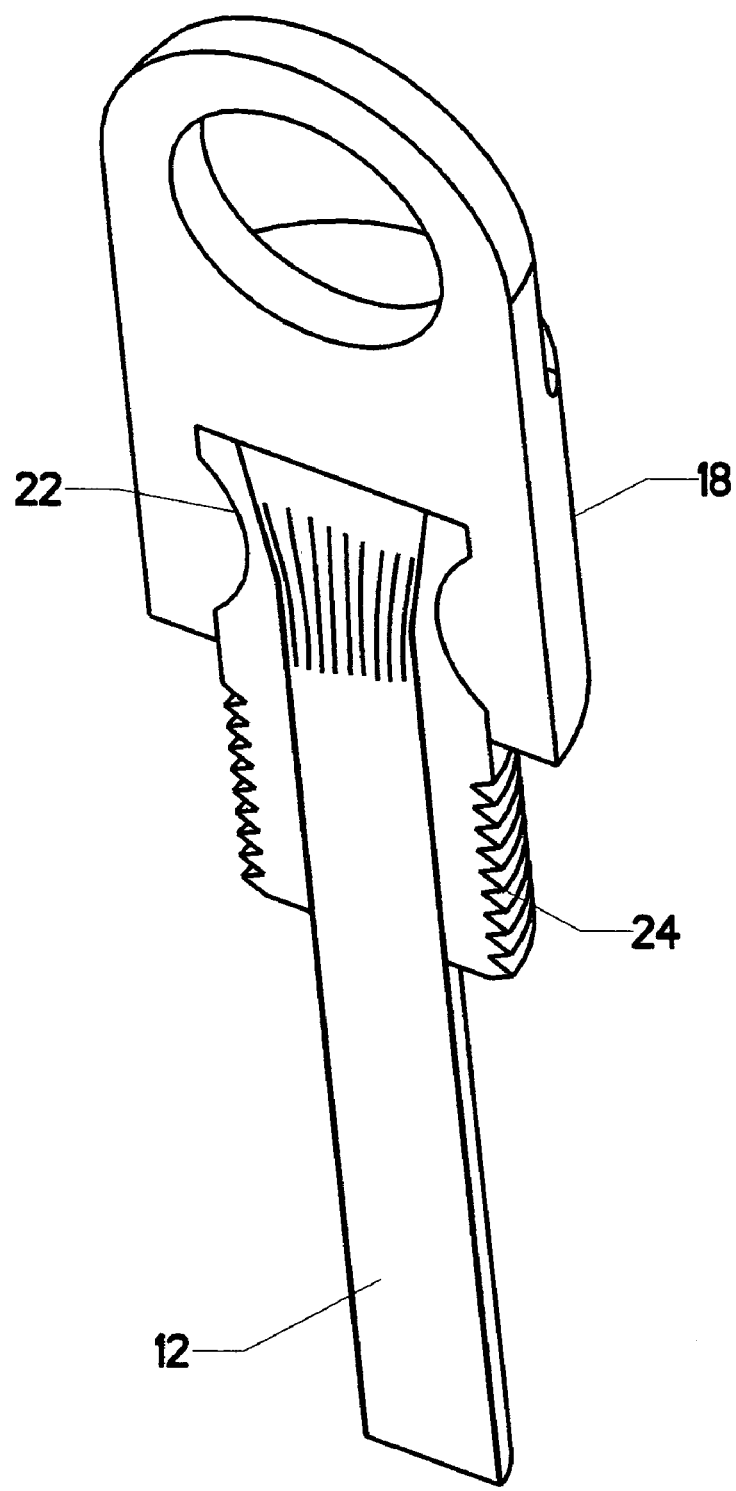
FIG. 9 is a perspective sectional view, showing a molded termination.

Combinations of features are also possible. FIG. 9 shows a shell 10 having concave region 22 on its upper half and threaded region 24 on its lower half. Molded termination 18 is formed around the assembly as described previously. Threaded portion 24 can then be used to thread on locking nuts or similar items.

Figure 10:
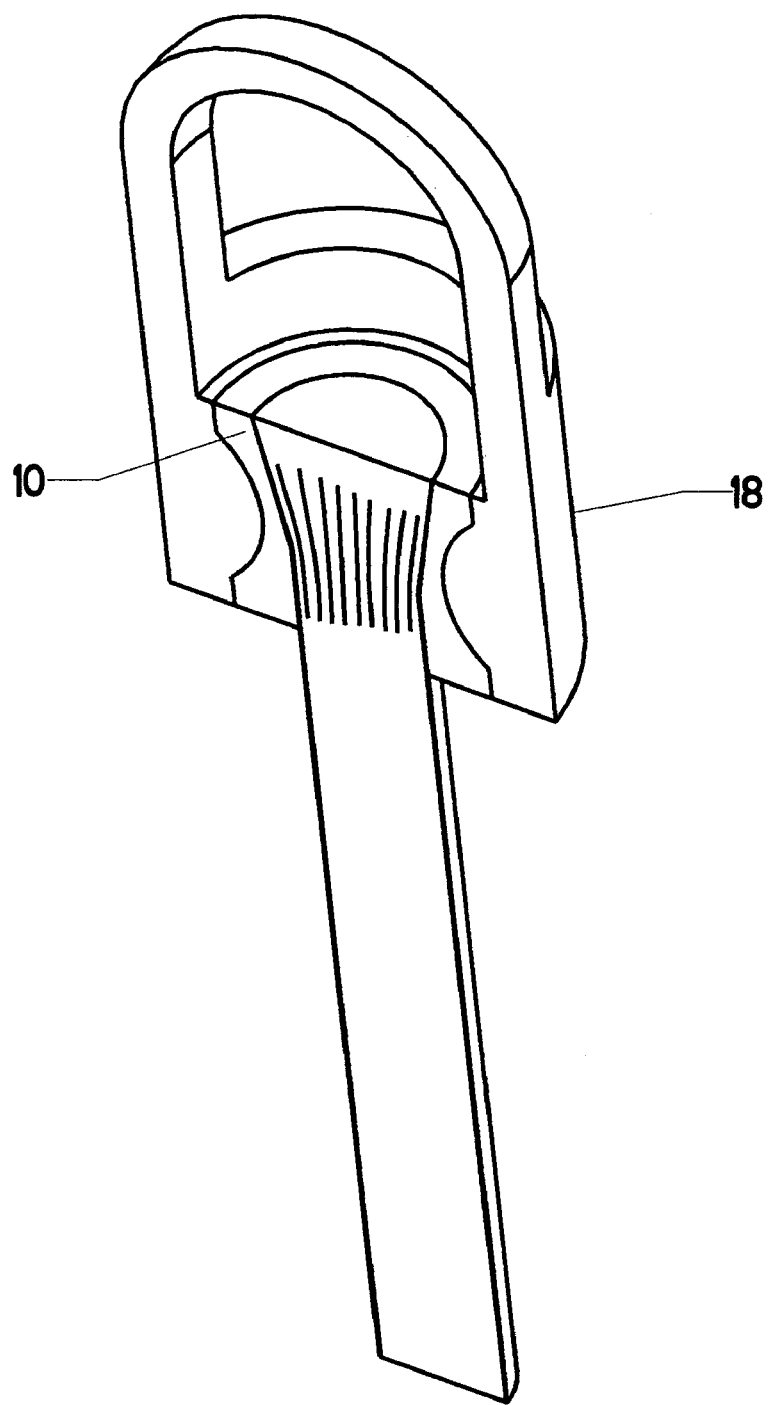
FIG. 10 is a perspective sectional view, showing a molded termination.

FIG. 10 shows yet another alternate embodiment for shell 10. In this configuration, molded anchor 18 does not need to touch the upper or lower surfaces of shell 10.

The examples shown in FIGS. 1 through 10 represent the use of three materials to create a termination (exclusive of the cable itself). The first is the material used to create the shell. The second is the potting compound used to lock the cable strands into the shell. The third is the compound used to form the molded anchor. The selection of each of the three materials can be made to facilitate a particular process, such as the selection of a ceramic for the shell in order to provide thermal insulation for the potting compounds and the strands when molten metal is cast over the shell. It is also possible, however, to practice a simplified version of the process in which the shell is omitted.

Figure 11:
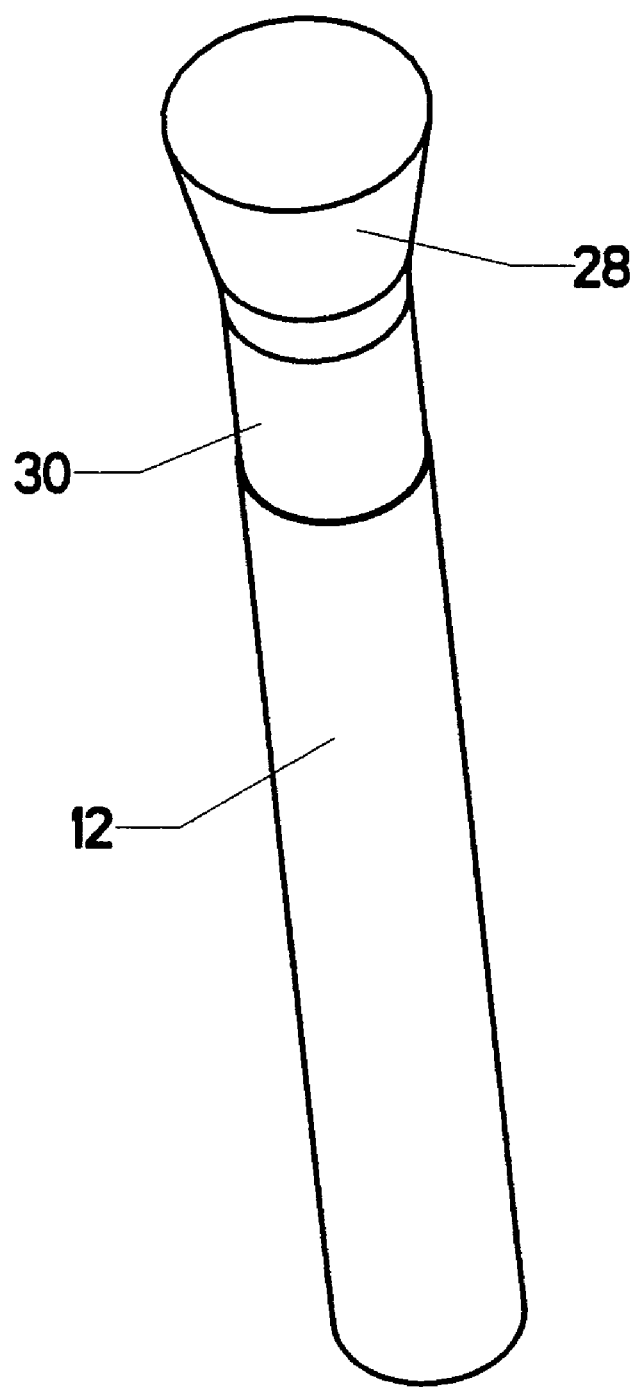
FIG. 11 is a perspective view, showing a molded region of a cable.
Figure 12:
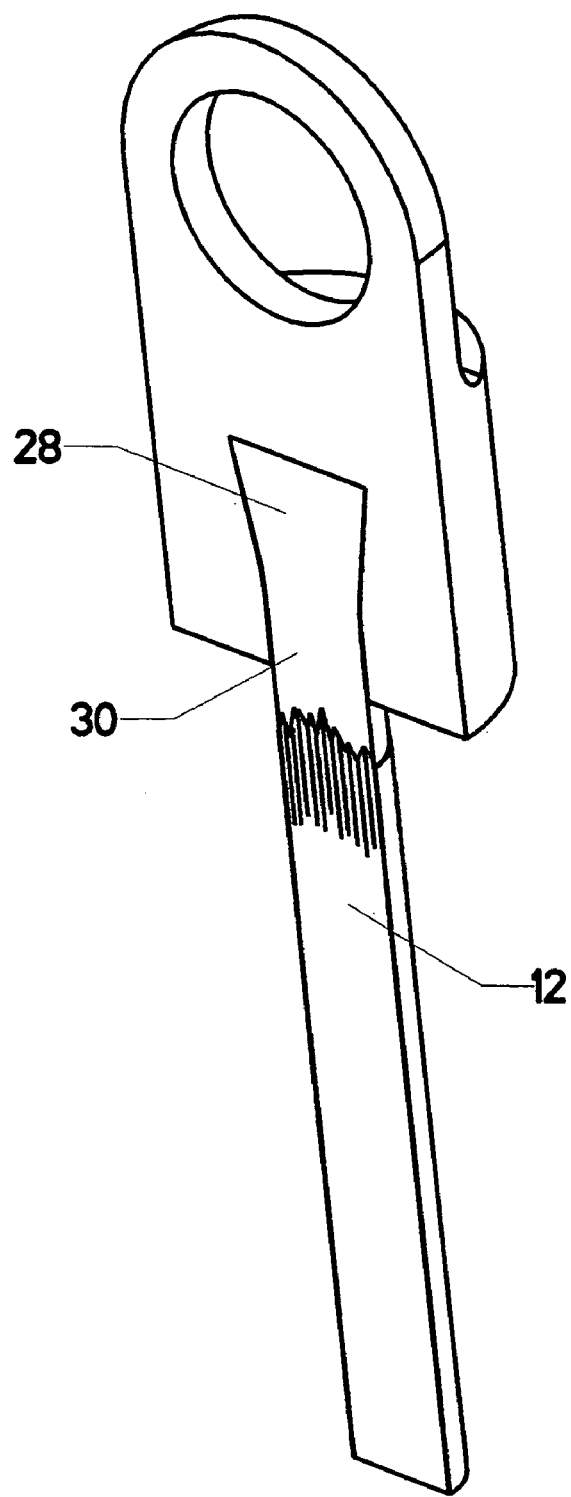
FIG. 12 is a perspective sectional view, sowing a molded termination formed without a shell.

FIG. 11 shows a cable 12 in which the strands have been splayed, infused with liquid potting compound, and allowed to harden inside a mold which shapes them into molded region 28. It may be desirable to include extended portion 30 in order to further protect the cable. Molded region 28 is then placed within a second mold and molded anchor 18 is formed around it. Extended portion 30 protects the cable from the second molding process if need be. It can also protect the cable from chemical reactions which may occur in a reactive molding process. FIG. 12 shows the completed assembly, where a molded anchor has been formed over the previously formed molded region 28.

Figure 13:
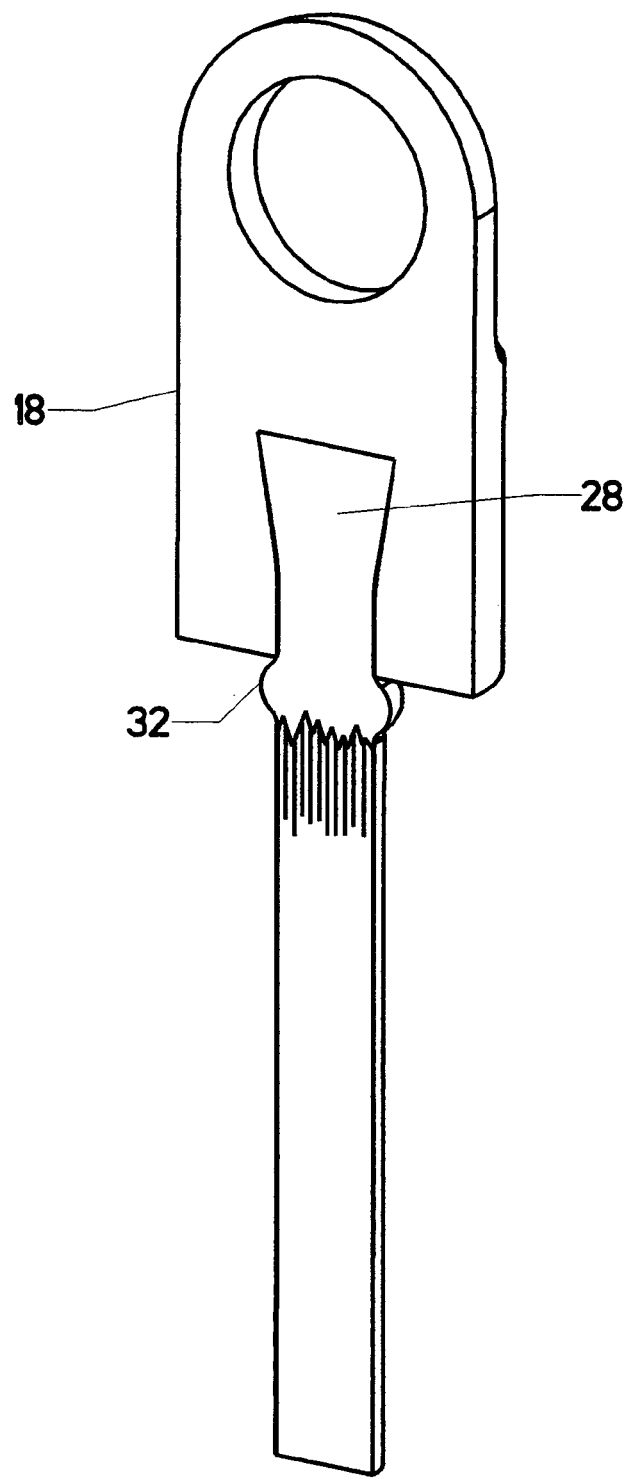
FIG. 13 is a perspective sectional view, showing a molded termination formed without a shell.
Figure 13B:
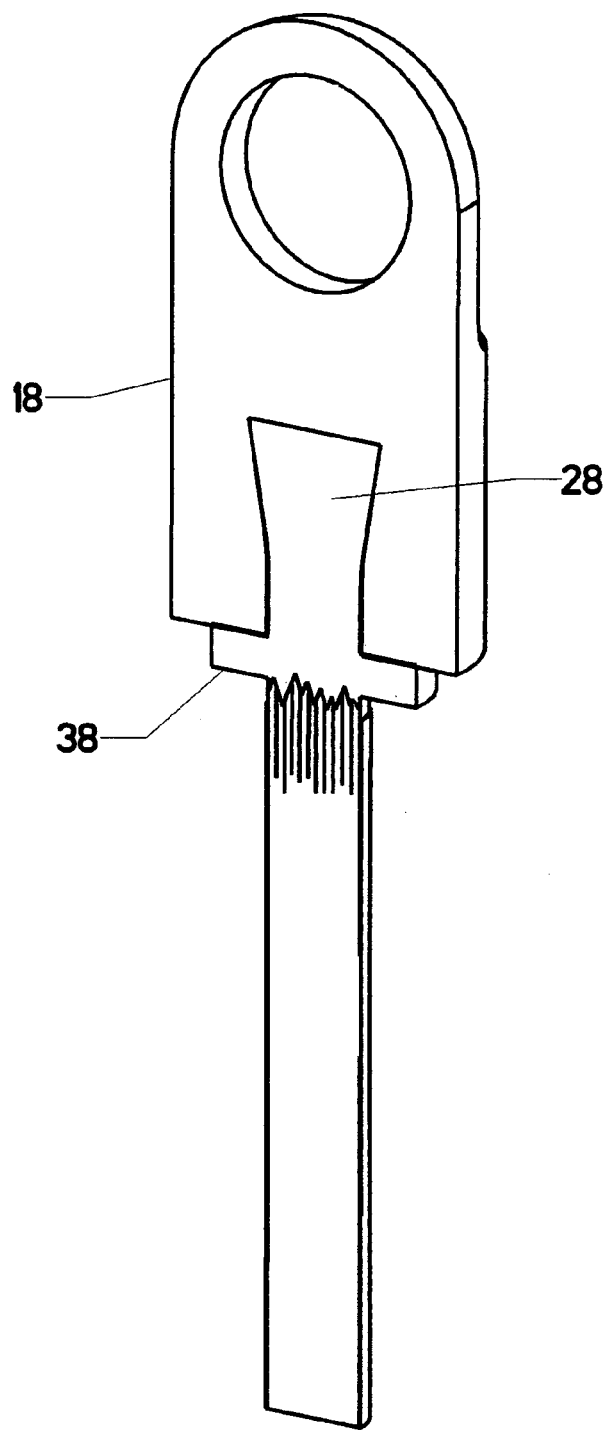
FIG. 13B is a perspective sectional view, showing a molded termination formed without a shell.

The use of the initial mold to create molded region 28 allows the inclusion of many additional useful features. As an example, FIG. 13 shows the inclusion of flow control lip 32. If the second mold operation is to be die casting of molten metal, flow control lip 32 can prevent the downward leakage of any molten metal. The lip can take on many sizes and shapes. FIG. 13B shows sealing flange 38, which provides protection over a larger surface area. Sealing flange 38 is designed to mate with and seal off the bottom portion of the mold cavity.

Figure 14:
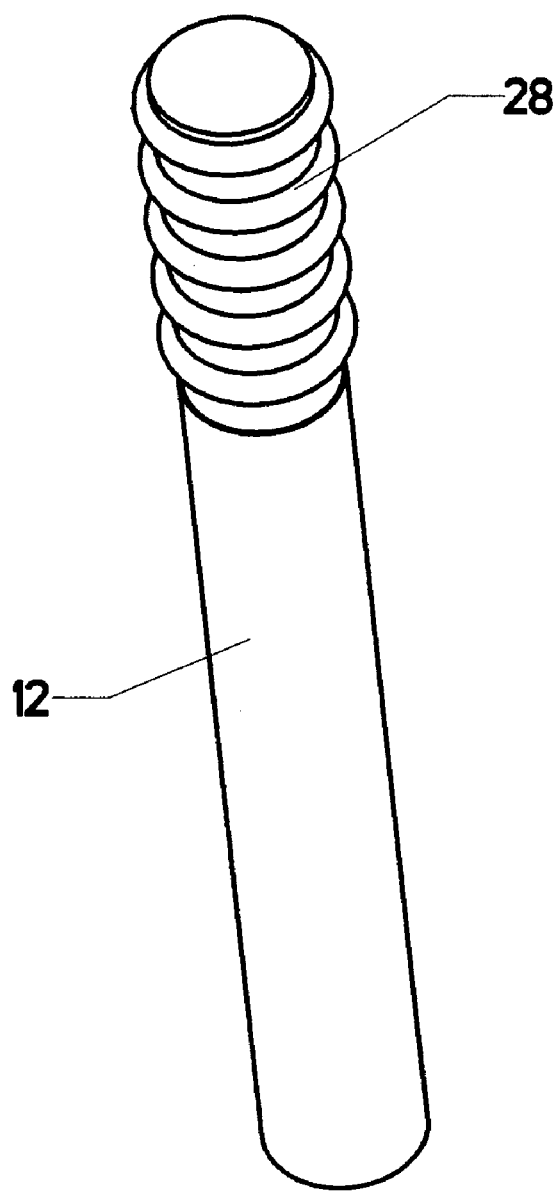
FIG. 14 is a perspective view, showing a molded region of a cable.

A linearly expanding cross section has been illustrated for molded region 28. However, virtually any type of geometry can be used, so long as it mechanically interlocks with molded anchor 18. FIG. 14 shows one such variation, in which a series of ribs have been molded into molded region 28. When the second molding operation is performed, these ribs will lock the material injected in the second molding operation to molded region 28.

Many different types of molds can be used. FIG. 15 shows a simple two part mold designated as first mold 40. It is shown opening after the liquid potting compound has turned solid to form molded region 28. The cable with the molded region is then placed into a second mold so that the balance of the molded anchor can be "overmolded." FIG. 16 shows second mold 42. It closes over molded region 28. A second material is ithen injected into the cavity surrounding the molded region and allowed to harden. When the mold opens, a finished termination such as shown in FIG. 12 will be removed.

Thus, the practice of the inventive process without the use of a separate shell can be characterized as using only two materials to create a termination (exclusive of the cable itself). The first material is used to infuse the cable strands and to harden into molded region 28 within a first mold. The second material is then placed around this first material and allowed to harden within a second mold.

Although the die casting process has been used as an example throughout this disclosure, the reader should bear in mind that the techniques and devices shown are applicable to many different molding processes. Injection molding, resin transfer molding, and vacuum molding are additional good examples of processes which can be used to create molded anchor 18.

Although the "eye" or hoop style of termination has been used throughout the disclosure, the reader should bear in mind that any type of terminal shape or form could be used. For example, a hook, threaded stud, fork, or stop could be substituted for the hoop shown.

The terminations formed have been illustrated on the end of a cable. Those skilled in the art will realize, however, that such terminations could be formed at some intermediate point along the cable as well.

Although the preceding description contains significant detail, it should not be construed as limiting the scope of the invention but rather as providing illustrations of the preferred embodiments of the invention.

Having described my invention, I claim:

1. A method for creating a termination affixed to a length of strands of a cable, comprising:
   a. providing a shell made of a first material, wherein said shell includes a passage;
   b. providing a potting compound which is initially in a liquid state but which will harden into a solid state over time;
   c. placing said length of strands within said passage in said shell;
   d. at some point infusing said length of strands with said potting compound in said liquid state;
   e. allowing said potting compound to harden into said solid state while said length of strands lie within said passage, thereby bonding said length of strands to said shell;
   d. placing said length of strands and said shell into a mold; and
   e. molding a molded anchor made of a second material having properties different from said first material around said length of strands and said shell to form a completed termination.

2. A method as recited in claim 1, further comprising providing a mechanical interlocking feature on said shell so that when said molded anchor is molded around said shell said molded anchor will be mechanically locked to said shell.

3. A method as recited in claim 2, wherein said mechanical interlocking feature comprises a concave region.

4. A method as recited in claim 2, wherein said mechanical interlocking feature comprises an external thread.

5. A method as recited in claim 2, wherein said mechanical interlocking feature comprises a serration.

6. A method as recited in claim 1, wherein said molded anchor is molded over a portion of all the external surfaces of said shell in order to mechanically interlock with said shell.

7. A method as recited in claim 1, further comprising providing said shell with a cable shield flange positioned to prevent contact between said molded anchor and said cable.

8. A method as recited in claim 6, further comprising providing said shell with a cable shield flange positioned to prevent contact between said molded anchor and said cable.

9. A method as recited in claim 1, further comprising providing a separate cable shield flange positioned to prevent contact between said molded anchor and said cable.

10. A method as recited in claim 1, further comprising providing a separate cable shield flange positioned to prevent contact between said molded anchor and said cable.

11. A method for creating a termination affixed to a length of strands of a cable, comprising:
   a. providing a potting compound which is initially in a liquid state but which will harden into a solid state over time;
   b. placing said length of strands into a first mold;
   c. at some point infusing said length of strands with said potting compound in said liquid state;
   d. allowing said potting compound to harden into said solid state while said length of strands lie within said first mold, thereby forming a molded region containing said length of strands and said hardened potting compound;
   e. placing said molded region into a second mold; and
   f. molding a molded anchor made of a second material having properties different from said potting compound around said molded region to form a completed termination.

12. A method as recited in claim 11, further comprising providing a mechanical interlocking feature on said molded region so that when said molded anchor is molded around said molded region said molded anchor will be mechanically locked to said molded region.

13. A method as recited in claim 12, wherein said mechanical interlocking feature comprises a concave region.

14. A method as recited in claim 12, wherein said mechanical interlocking feature comprises an external thread.

15. A method as recited in claim 12, wherein said mechanical interlocking feature comprises a serration.

16. A method as recited in claim 11, wherein said molded anchor is molded over a portion of all the external surfaces of said molded region in order to mechanically interlock with said shell.

17. A method as recited in claim 11, further comprising providing said molded region with an extended portion positioned to prevent contact between said molded anchor and said cable.

18. A method as recited in claim 16, further comprising providing said molded region with an extended portion positioned to prevent contact between said molded anchor and said cable.

19. A method as recited in claim 12, wherein said mechanical interlocking feature comprises a convex region.

20. A method as recited in claim 12, wherein said mechanical interlocking feature comprises a circumferential rib.

* * * * *